(12) United States Patent
Hu et al.

(10) Patent No.: US 12,442,116 B2
(45) Date of Patent: Oct. 14, 2025

(54) PREPARATION METHOD OF A UNIDIRECTIONAL MOISTURIZING NANOFIBER FACIAL MASK SUBSTRATE WITH ASYMMETRIC WETTABILITY

(71) Applicant: City University of Hong Kong, Kowloon (HK)

(72) Inventors: Jinlian Hu, Kowloon (HK); Yifan Si, Kowloon (HK); Shuo Shi, Kowloon (HK); Chunxia Guo, Kowloon (HK)

(73) Assignee: City University of Hong Kong, Kowloon (HK)

( * ) Notice: Subject to any disclaimer, the term of this patent is extended or adjusted under 35 U.S.C. 154(b) by 446 days.

(21) Appl. No.: 17/866,632

(22) Filed: Jul. 18, 2022

(65) Prior Publication Data

US 2023/0063352 A1    Mar. 2, 2023

(30) Foreign Application Priority Data

Sep. 1, 2021    (CN) .......................... 202111020708.X

(51) Int. Cl.
*D04H 1/728*    (2012.01)
*A61K 8/02*    (2006.01)
(Continued)

(52) U.S. Cl.
CPC .......... *D04H 1/728* (2013.01); *A61K 8/0212* (2013.01); *A61K 8/19* (2013.01); *A61K 8/731* (2013.01);
(Continued)

(58) Field of Classification Search
CPC ..................................................... D04H 1/728
See application file for complete search history.

(56) References Cited

U.S. PATENT DOCUMENTS 9,890,487 B2    2/2018   Ochiai et al.

FOREIGN PATENT DOCUMENTS

| CN | 103784332 | * | 5/2014 |
| CN | 109998932 | * | 7/2019 |

(Continued)

*Primary Examiner* — Edmund H Lee
(74) *Attorney, Agent, or Firm* — Renner, Kenner, Greive, Bobak, Taylor & Weber

(57) ABSTRACT

The present invention discloses a unidirectional moisturizing nanofiber facial mask substrate with asymmetric wettability and preparation thereof. The preparation includes: preparing a superhydrophilic electrospun fiber membrane on a substrate by electrospinning; preparing a hydrophobic electrospun fiber membrane by electrospinning on a lateral surface of the superhydrophilic electrospun fiber membrane away from the substrate to form a double-layered membrane; and removing the substrate, and drying the double-layered membrane to obtain the asymmetric unidirectional moisturizing facial mask substrate with one side being superhydrophilic and the other side being hydrophobic. The superhydrophilic layer can absorb a nutrient solution and be applied to the skin surface, while the hydrophobic layer can keep itself dry, reduce the consumption of the nutrient solution and inhibit volatilization of the nutrient solution. The process is simple, uses readily available materials, and is non-toxic, environmentally friendly, and low-cost, thus solving several key problems with current commercial facial mask substrates.

16 Claims, 5 Drawing Sheets

(51) Int. Cl.
    *A61K 8/19*     (2006.01)
    *A61K 8/73*     (2006.01)
    *A61K 8/87*     (2006.01)
    *D04H 1/4358*     (2012.01)

(52) U.S. Cl.
    CPC ............. *A61K 8/87* (2013.01); *D04H 1/4358* (2013.01); *A61K 2800/413* (2013.01)

(56) References Cited

FOREIGN PATENT DOCUMENTS

| | | | |
|---|---|---|---|
| JP | 2018166621 | * | 11/2018 |
| JP | 2019089736 | * | 6/2019 |
| KR | 20170024544 | * | 3/2017 |
| KR | 101919564 | * | 11/2018 |
| RU | 202107 | * | 2/2021 |
| WO | 2015138242 | | 9/2015 |
| WO | WO2018118450 | * | 6/2018 |

\* cited by examiner

PREPARATION METHOD OF A UNIDIRECTIONAL MOISTURIZING NANOFIBER FACIAL MASK SUBSTRATE WITH ASYMMETRIC WETTABILITY

TECHNICAL FIELD

The present invention relates to the technical field of electrospinning functional fiber materials, and in particular relates to a unidirectional moisturizing nanofiber facial mask substrate with asymmetric wettability and preparation thereof.

BACKGROUND

Facial masks have the functions of quickly replenishing and whitening facial skin, and removing acne from facial skin. They have gradually become a daily must-have and fast-selling product for people, especially beauty-conscious females. Currently, there are various types of facial masks on the market. Among them, due to their convenience and diversity, facial sheet masks with hydrophilic non-woven fabrics, cotton fabrics or silk or the like as the substrate, and which are loaded with different nutrient solutions are widely favored by consumers, and occupy the vast majority of the market. But in fact, these traditional sheet masks made of hydrophilic substrates have three obvious shortcomings: 1) the overall uniform hydrophilicity will cause their front and back sides to completely absorb the nutrient solution, resulting in excessive weight and waste of active ingredients; 2) both the front and back sides of the masks are wet, which will cause inconvenient operation and unsanitary problems; and 3) exposure of the fully wet masks in the environment will lead to the rapid volatilization of the nutrient solution; and prolonged use will lead to reverse absorption and loss of facial moisture.

Therefore, it is of great significance to develop a novel mask substrate with asymmetric wettability, which can partially absorb an essence, keep moisture and prevent volatilization.

SUMMARY

To solve at least one of the above technical problems, the present invention provides a unidirectional moisturizing nanofiber facial mask substrate with asymmetric wettability and preparation thereof. One side of the facial mask substrate prepared by the present invention is hydrophilic, and may absorb nutrient solution and attach to the face to exert specific effects; and a hydrophobic surface on the other side faces outward, which may keep itself dry and reduce the overall weight while locking in moisture of the hydrophilic layer to slow down volatilization of the moisture.

To achieve the above objectives, the present invention adopts the following technical solution:

The present invention provides a preparation method of a unidirectional moisturizing nanofiber facial mask substrate with asymmetric wettability, comprising the following steps:
  preparing a superhydrophilic electrospun fiber membrane on a substrate by electrospinning;
  preparing a hydrophobic electrospun fiber membrane by electrospinning on a lateral surface of the superhydrophilic electrospun fiber membrane away from the substrate to form a double-layered membrane; and
  removing the substrate, and drying the double-layered membrane to obtain the unidirectional moisturizing nanofiber facial mask substrate with asymmetric wettability.

The facial mask substrate obtained by such preparation method is superhydrophilic on one side and hydrophobic on the other side, and is a unidirectional moisturizing nanofiber facial mask substrate with asymmetric wettability. The preparation process of the present invention is simple, uses readily available raw materials, and is non-toxic, environmentally friendly, and low-cost. It solves several key problems existing in the current commercial facial mask substrates.

According to the preparation method of the present invention, preferably, the step of preparing the superhydrophilic electrospun fiber membrane on the substrate by electrospinning includes:
  preparation of a superhydrophilic electrospinning stock solution:
    dissolving thermoplastic polyurethane (TPU), a hydrophilic filler and a metal salt in a dimethylformamide or tetrahydrofuran solvent to obtain the superhydrophilic electrospinning stock solution; and
  preparation of the superhydrophilic electrospun fiber membrane:
    preparing the superhydrophilic electrospun fiber membrane by electrospinning the superhydrophilic electrospinning stock solution on the substrate, and placing the superhydrophilic electrospun fiber membrane together with the substrate at room temperature for later use.

In the preparation process of the superhydrophilic electrospun fiber membrane, the function of the hydrophilic filler is to improve the hydrophilicity and enhance the water absorption and water retention capacity of the facial mask substrate. The metal salt may improve the electric conductivity of the spinning solution for better spinnability. Compared with the traditional facial mask substrates, the facial mask substrate of the present invention is thinner and has a better water retention.

In the above preparation process of the superhydrophilic electrospun fiber membrane, preferably, the hydrophilic filler is microcrystalline cellulose; and more preferably, the particle size of the microcrystalline cellulose is 15-25 μm, e.g. 20 μm. The incorporation of the microcrystalline cellulose greatly improves the hydrophilicity of the facial mask substrate, and within the particle size range, the roughness of the substrate may be enhanced, thus further improving the hydrophilicity.

In the above preparation process of the superhydrophilic electrospun fiber membrane, preferably, the mass ratio of the thermoplastic polyurethane to the hydrophilic filler to the metal salt to the dimethylformamide or tetrahydrofuran solvent is (10-5):(5-2.5):(0.5-1):50, e.g. 10:5:1:50, 5:5:0.5:50, 5:2.5:0.75:50, and 10:5:0.5:50. If the hydrophilic filler content is too low, the hydrophilicity will be insufficient. If the hydrophilic filler content is too high, the spinning performance will be affected. If the metal salt content is too low, the electric conductivity will be reduced, which is not conducive to the spinnability. If the metal salt content is too high, the electric conductivity will be too high, making the electrospun fiber too thick and uneven. If the polyurethane content is too low or too high, the viscosity and the final spinnability will be affected.

In the above preparation process of the superhydrophilic electrospun fiber membrane, preferably, the thermoplastic polyurethane, the hydrophilic filler and the metal salt are dissolved in the dimethylformamide or tetrahydrofuran solvent at 60-80° C., and stirred for 3-10 h to obtain the superhydrophilic electrospinning stock solution, which is cooled to room temperature for later use.

According to the preparation method of the present invention, preferably, the step of preparing the hydrophobic electrospun fiber membrane includes:

preparation of a hydrophobic electrospinning stock solution:

dispersing a superhydrophobic nanomaterial in a dimethylformamide or tetrahydrofuran solvent to obtain a dispersion, and adding polyvinylidene fluoride (PVDF) and a metal salt to the dispersion to obtain the hydrophobic electrospinning stock solution; and preparation of the hydrophobic electrospun fiber membrane:

preparing the hydrophobic electrospun fiber membrane by electrospinning the hydrophobic electrospinning stock solution on the lateral surface of the superhydrophilic electrospun fiber membrane away from the substrate to form the double-layered membrane.

In the preparation process of the hydrophobic electrospun fiber membrane, the function of the superhydrophobic nanomaterial is to improve the hydrophobicity of the facial mask substrate, so that the facial mask substrate has a unidirectional moisture permeability and may inhibit volatilization of moisture. The metal salt may improve the electric conductivity of the spinning solution for better spinnability. Compared with the traditional facial mask substrates, the facial mask substrate of the present invention has a hydrophobic-hydrophilic double-layered structure, and may achieve unidirectional moisture permeability and better water retention.

In the above preparation process of the hydrophobic electrospun fiber membrane, preferably, the superhydrophobic nanomaterial is one or a combination of two or more, in any ratio, selected from the group consisting of: superhydrophobic silica aerogels, superhydrophobic zinc oxide nanoparticles, superhydrophobic titanium dioxide nanoparticles, and superhydrophobic magnesium hydroxide nanoparticles. The incorporation of these superhydrophobic nanoparticles will not affect the electrospinning performance and may significantly enhance the hydrophobicity of the facial mask substrate.

In the above preparation process of the hydrophobic electrospun fiber membrane, preferably, the mass ratio of the polyvinylidene fluoride to the superhydrophobic nanomaterial to the metal salt to the dimethylformamide or tetrahydrofuran solvent is (20-40):1:(0.1-0.2):(50-200), e.g. 40:1:0.1:200 to 20:1:0.2:50. If the superhydrophobic nanoparticle content is too low, the hydrophobicity of the facial mask substrate will be insufficient. If the superhydrophobic nanoparticle content is too high, the hydrophobicity will be too high, and the unidirectional moisture permeability may not be achieved. If the metal salt content is too low, the electric conductivity will be reduced, which is not conducive to the spinnability. If the metal salt content is too high, the electric conductivity will be too high, making the electrospun fiber too thick and uneven. If the polyvinylidene fluoride content is too low or too high, the viscosity and the final spinnability will be affected.

In the above preparation process of the hydrophobic electrospun fiber membrane, preferably, the superhydrophobic nanomaterial is dispersed in the dimethylformamide or tetrahydrofuran solvent, and ultrasonically dispersed for 20-60 min to obtain the dispersion; and the polyvinylidene fluoride (PVDF) and the metal salt are added to the dispersion, and stirred at 40-60° C. for 1-3 h to obtain the hydrophobic electrospinning stock solution, which is cooled to room temperature for later use.

In the above preparation process of the superhydrophilic electrospun fiber membrane and preparation process of the hydrophobic electrospun fiber membrane, preferably, the metal salts are lithium chloride.

In the above preparation process of the superhydrophilic electrospun fiber membrane and preparation process of the hydrophobic electrospun fiber membrane, preferably, the electrospinning is performed by a single-needle electrospinning device at a voltage of 18-26 kV, an injection pump flow rate of 0.2-0.4 mL/h, and a receiving distance of 10-15 cm. In the preparation process of the superhydrophilic electrospun fiber membrane and the hydrophobic electrospun fiber membrane, the conditions of the two electrospinning processes may be the same or different, and the solvents used may also be the same or different.

According to the preparation method of the present invention, preferably, the substrate is one selected from the group consisting of: aluminum foil, gauze, and oiled paper.

According to the preparation method of the present invention, preferably, the drying is performed at 40-70° C. for 12-24 h.

Another aspect of the present invention provides a unidirectional moisturizing nanofiber facial mask substrate with asymmetric wettability obtained by the above preparation method. The facial mask substrate has two layers integrally formed by electrospinning, with one being a superhydrophilic layer, and the other being a hydrophobic layer.

The nutrient solution is only adsorbed to the superhydrophilic layer in a facial mask that is made using the unidirectional moisturizing nanofiber facial mask substrate of the present invention. This greatly saves cost and reduces weight. The hydrophobic layer is kept dry and plays the roles of delaying volatilization of liquid and prolonging the effective time of the facial mask. By means of the dry hydrophobic layer, the facial mask prevents hands from getting wet during use. It is easy to use and is more hygienic. In addition, the electrospun nanofiber facial mask substrate has good air permeability.

DETAILED DESCRIPTION

To illustrate the present invention more clearly, the present invention will be further described below with reference to the preferred examples. Those skilled in the art should understand that the content specifically described below is illustrative, not restrictive, and should not be used to limit the protection scope of the present invention.

All numerical designations in the present invention (e.g., temperature, time, concentration and weight or mass, including the range of each) may generally be approximate values of (+) or (−) in increments of 0.1 or 1.0, as appropriate. All numerical designations are understood to be preceded by the term "about".

Example 1

A facial mask substrate with a unidirectional moisturizing function and asymmetric wettability was prepared in the present example, including the following steps:
(1) Preparation of a superhydrophilic electrospinning stock solution A:

4 g of thermoplastic polyurethane (TPU) solid, 2 g of microcrystalline cellulose powder, and 0.4 g of lithium chloride powder metal salt were dissolved in 20 g of a dimethylformamide (DMF) solvent. The solution was heated and stirred in a 60° C. water bath for 3 h to obtain a viscous and transparent superhydrophilic electrospinning stock solution A, which was cooled to room temperature for later use.

Figure 1A:
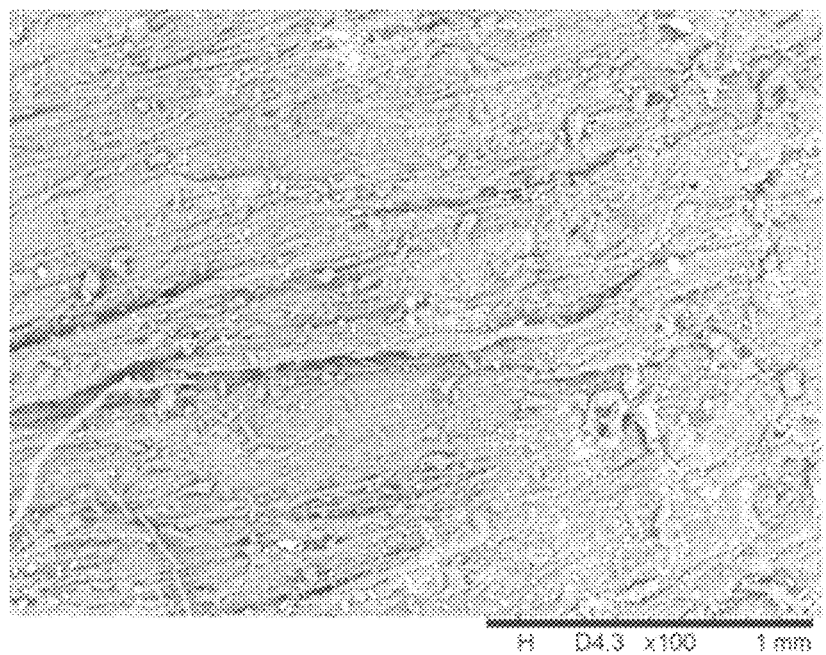
FIGS. 1a and 1b are scanning electron microscope images of the superhydrophilic layer in the facial mask substrate obtained in Example 1 of the present invention.
Figure 1B:
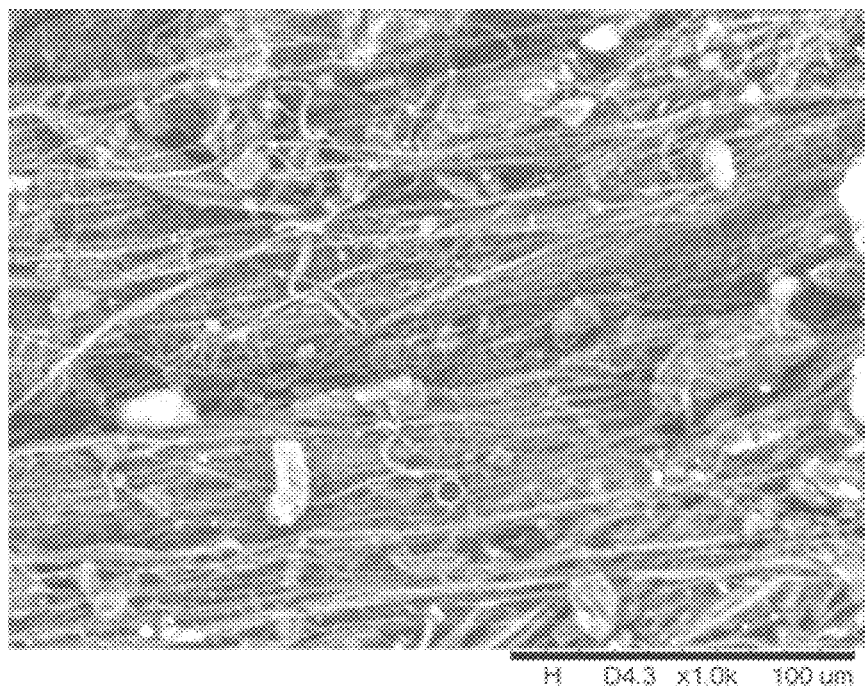

(2) Preparation of a superhydrophilic electrospun fiber membrane:

Using a single-needle electrospinning device, at a voltage of 18 kV, an injection pump flow rate of 0.2 mL/h, and a receiving distance of 15 cm, the superhydrophilic electrospinning stock solution A obtained in step (1) was collected on an aluminum foil for preparation of a superhydrophilic electrospun fiber membrane. As shown by the scanning electron microscope images of the superhydrophilic electrospun fiber membrane in FIGS. 1a and 1b, the electrospun fibers are staggered, with a diameter of about 200 nm to 2 μm, and bulk cellulose microcrystals of 15-25 μm randomly and irregularly distributed inside the fibers.

The superhydrophilic electrospun fiber membrane was placed together with the aluminum foil at room temperature for later use.

(3) Preparation of a hydrophobic electrospinning stock solution B:

0.1 g of superhydrophobic silica aerogel powder was dispersed in 20 g of a dimethylformamide (DMF) solvent, and ultrasonically dispersed for 30 min. 4 g of polyvinylidene fluoride (PVDF) solid and 0.4 g of lithium chloride were added to the dispersion, and stirred in a 60° C. water bath for 1 h to obtain a viscous and transparent hydrophobic electrospinning stock solution B, which was cooled to room temperature for later use.

Figure 2A:
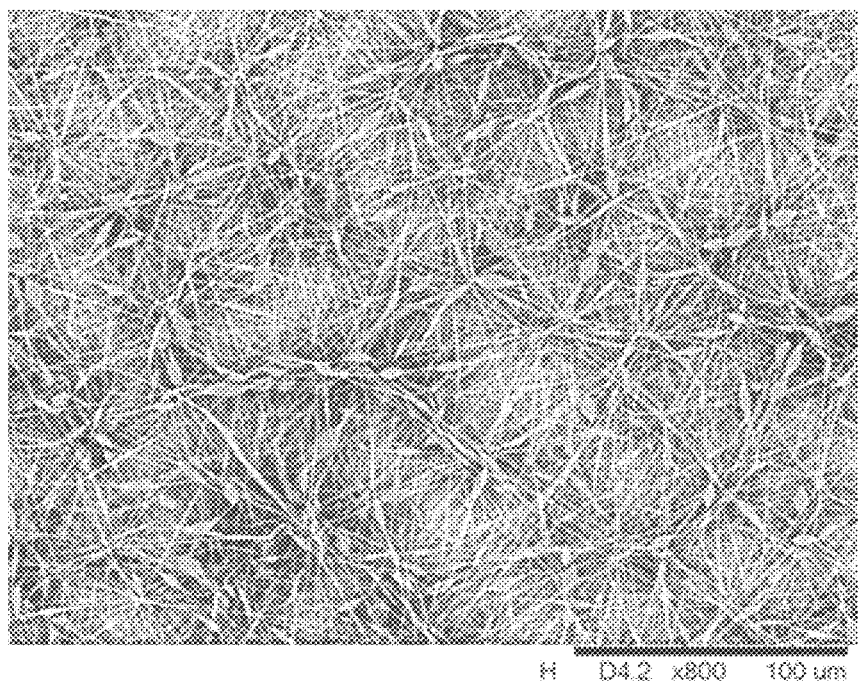
FIGS. 2a and 2b are scanning electron microscope images of the hydrophobic layer in the facial mask substrate obtained in Example 1 of the present invention.
Figure 2B:
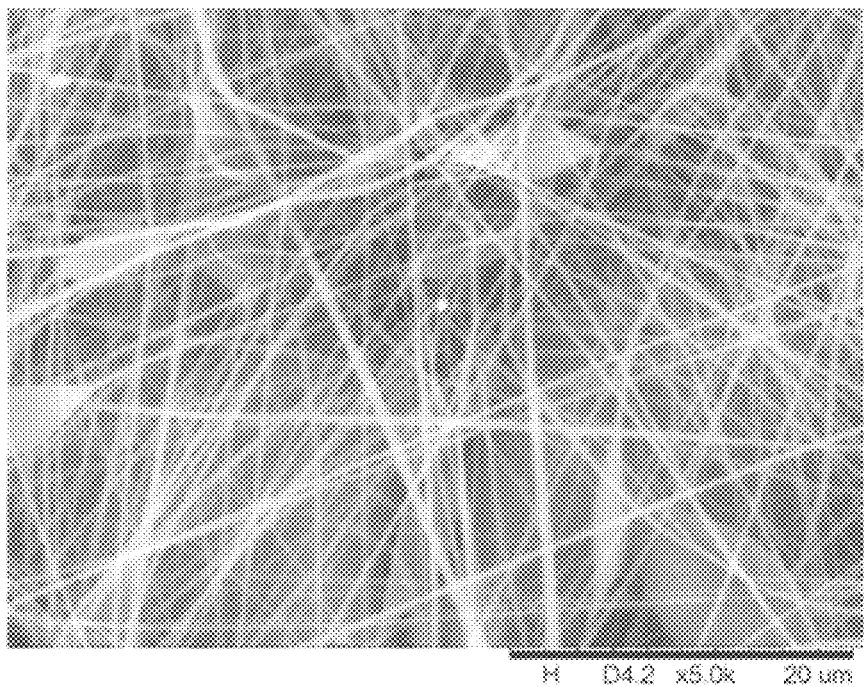

(4) Preparation of a hydrophobic electrospun fiber membrane:

Using a single-needle electrospinning device, at a voltage of 22 kV, an injection pump flow rate of 0.2 mL/h, and a receiving distance of 15 cm, the hydrophobic electrospinning stock solution B obtained in step (3) was collected on the superhydrophilic electrospun fiber membrane obtained in step (2) for preparation of a hydrophobic electrospun fiber membrane. As shown by the scanning electron microscope images of the hydrophobic electrospun fiber membrane in FIGS. 2a and 2b, the electrospun fibers have a diameter of about 200 nm to 2 μm, and have some beaded structures arranged randomly and irregularly.

(5) Finally, the double-layered membrane was removed from the aluminum foil and placed in a 40° C. oven for 12 h to obtain an independent facial mask substrate with a unidirectional moisturizing function and asymmetric wettability.

Example 2

A facial mask substrate with a unidirectional moisturizing function and asymmetric wettability was prepared in the present example, including the following steps:
(1) Preparation of a superhydrophilic electrospinning stock solution A:

2 g of thermoplastic polyurethane (TPU) solid, 2 g of microcrystalline cellulose powder, and 0.2 g of lithium chloride powder metal salt were dissolved in 20 g of a tetrahydrofuran (THF) solvent. The solution was heated and stirred in a 80° C. water bath for 8 h to obtain a viscous and transparent superhydrophilic electrospinning stock solution A, which was cooled to room temperature for later use.

(2) Preparation of a superhydrophilic electrospun fiber membrane:

Using a single-needle electrospinning device, at a voltage of 22 kV, an injection pump flow rate of 0.3 mL/h, and a receiving distance of 15 cm, the superhydrophilic electrospinning stock solution A obtained in step (1) was collected on aluminum foil for preparation of a superhydrophilic electrospun fiber membrane, which was placed together with the aluminum foil at room temperature for later use.

Figure 3A:
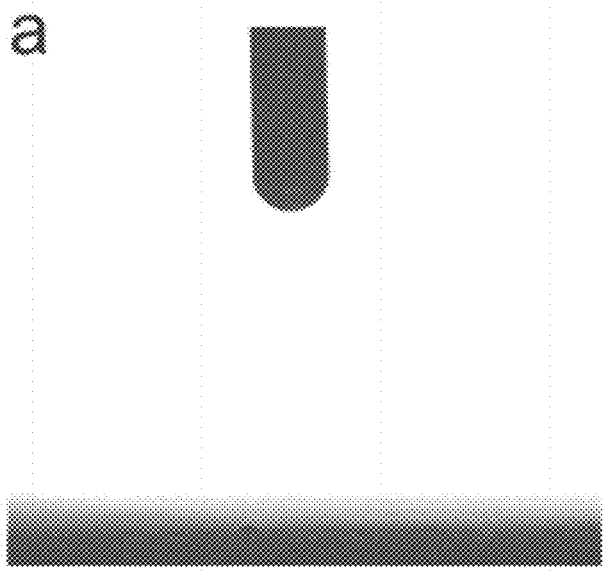
FIG. 3a is a photo of the contact angle of the superhydrophilic layer in the facial mask substrate obtained in Example 2 of the present invention.

Through characterization of the contact angle (as shown in FIG. 3a), the superhydrophilic electrospun fiber membrane exhibited excellent superhydrophilicity, where the water droplet was completely absorbed with the contact angle being 0°.

(3) Preparation of a hydrophobic electrospinning stock solution B:

0.1 g of superhydrophobic silica aerogel powder was dispersed in 20 g of a tetrahydrofuran (THF) solvent, and ultrasonically dispersed for 30 min. 4 g of polyvinylidene fluoride (PVDF) solid and 0.4 g of lithium chloride were added to the dispersion, and stirred in a 60° C. water bath for 1 h to obtain a viscous and transparent hydrophobic electrospinning stock solution B, which was cooled to room temperature for later use.

Figure 3B:
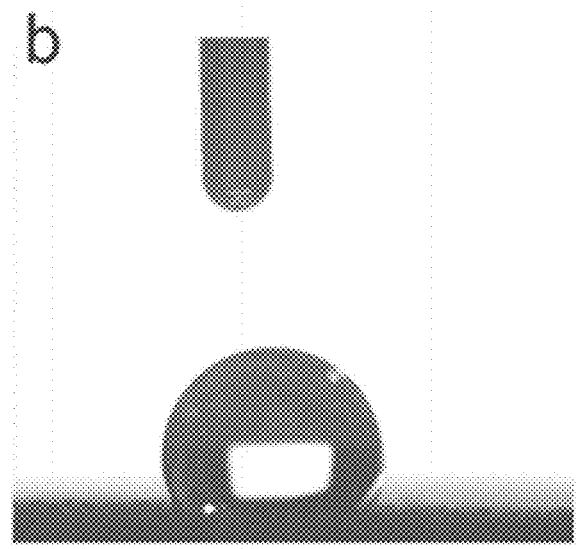
FIG. 3b is a photo of the contact angle of the hydrophobic layer in the facial mask substrate obtained in Example 2 of the present invention.

(4) Preparation of a hydrophobic electrospun fiber membrane:

Using a single-needle electrospinning device, at a voltage of 18 kV, an injection pump flow rate of 0.2 mL/h, and a receiving distance of 15 cm, the hydrophobic electrospinning stock solution B obtained in step (3) was collected on the superhydrophilic electrospun fiber membrane obtained in step (2) for preparation of a hydrophobic electrospun fiber membrane. According to FIG. 3b, the layer has certain hydrophobicity, and the contact angle of the water droplet was about 120°.

(5) Finally, the double-layered membrane was removed from the aluminum foil and placed in a 40° C. oven for 12 h to obtain an independent facial mask substrate with a unidirectional moisturizing function and asymmetric wettability.

Example 3

A facial mask substrate with a unidirectional moisturizing function and asymmetric wettability was prepared in the present example, including the following steps:
(1) Preparation of a superhydrophilic electrospinning stock solution A:

2 g of thermoplastic polyurethane (TPU) solid, 1 g of microcrystalline cellulose powder, and 0.3 g of lithium chloride powder metal salt were dissolved in 20 g of a dimethylformamide (DMF) solvent. The solution was heated and stirred in a 70° C. water bath for 5 h to obtain a viscous and transparent superhydrophilic electrospinning stock solution A, which was cooled to room temperature for later use.

(2) Preparation of a superhydrophilic electrospun fiber membrane:

Using a single-needle electrospinning device, at a voltage of 26 kV, an injection pump flow rate of 0.4 mL/h, and a receiving distance of 12 cm, the superhydrophilic electrospinning stock solution A obtained in step (1) was collected on aluminum foil for preparation of a superhydrophilic electrospun fiber membrane, which was placed together with the aluminum foil at room temperature for later use.

(3) Preparation of a hydrophobic electrospinning stock solution B:

0.3 g of superhydrophobic silica nanoparticles were dispersed in 20 g of a dimethylformamide (DMF) solvent, and ultrasonically dispersed for 30 min. 2 g of polyvinylidene fluoride (PVDF) solid and 0.3 g of lithium chloride were added to the dispersion, and stirred in a 60° C. water bath for 2 h to obtain a viscous and transparent hydrophobic electrospinning stock solution B, which was cooled to room temperature for later use.

(4) Preparation of a hydrophobic electrospun fiber membrane:

Using a single-needle electrospinning device, at a voltage of 20 kV, an injection pump flow rate of 0.2 mL/h, and a receiving distance of 15 cm, the hydrophobic electrospinning stock solution B obtained in step (3) was collected on the superhydrophilic electrospun fiber membrane obtained in step (2) for preparation of a hydrophobic electrospun fiber membrane.

(5) Finally, the double-layered membrane was removed from the aluminum foil and placed in a 40° C. oven for 48 h to obtain an independent facial mask substrate with a unidirectional moisturizing function and asymmetric wettability.

Figure 4:
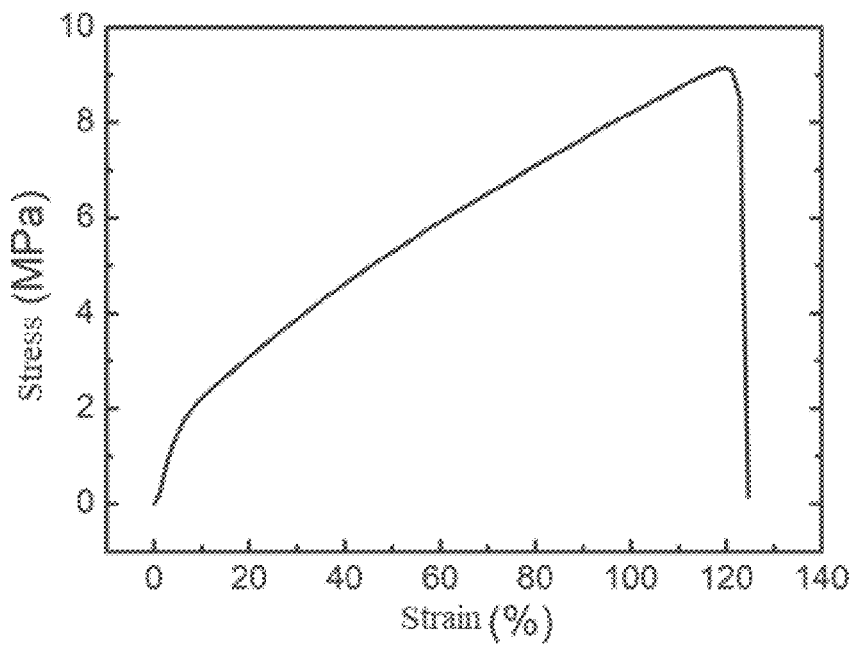
FIG. 4 shows a tensile-fracture curve of the facial mask substrate obtained in Example 2 of the present invention.

The mechanical properties of the obtained facial mask substrate were tested. The obtained substrate was cut into a 1 cm×5 cm strip, and both ends of the strip were fixed with clamps and stretched at a constant speed of 1 mm/s until the strip fractured. The obtained tensile-fracture curve is shown in FIG. 4. It can be seen that the tensile strength of the obtained facial mask substrate is about 9.1 MPa, which proves that the facial mask substrate can fully meet the needs of daily use, is not easy to break and has good tensile strength.

Example 4

A facial mask substrate with a unidirectional moisturizing function and asymmetric wettability was prepared in the present example, including the following steps:

(1) Preparation of a superhydrophilic electrospinning stock solution A:

4 g of thermoplastic polyurethane (TPU) solid, 2 g of microcrystalline cellulose powder, and 0.2 g of lithium chloride powder metal salt were dissolved in 20 g of a dimethylformamide (DMF) solvent. The solution was heated and stirred in a 70° C. water bath for 8 h to obtain a viscous and transparent superhydrophilic electrospinning stock solution A, which was cooled to room temperature for later use.

(2) Preparation of a superhydrophilic electrospun fiber membrane:

Using a single-needle electrospinning device, at a voltage of 20 kV, an injection pump flow rate of 0.2 mL/h, and a receiving distance of 12 cm, the superhydrophilic electrospinning stock solution A obtained in step (1) was collected on an oiled paper for preparation of a superhydrophilic electrospun fiber membrane, which was placed together with the oiled paper at room temperature for later use.

(3) Preparation of a hydrophobic electrospinning stock solution B:

0.4 g of superhydrophobic magnesium hydroxide nanoparticles were dispersed in 20 g of a tetrahydrofuran (THF) solvent, and ultrasonically dispersed for 30 min. 3 g of polyvinylidene fluoride (PVDF) solid and 0.3 g of lithium chloride were added to the dispersion, and stirred in a 70° C. water bath for 3 h to obtain a viscous and transparent hydrophobic electrospinning stock solution B, which was cooled to room temperature for later use.

(4) Preparation of a hydrophobic electrospun fiber membrane:

Using a single-needle electrospinning device, at a voltage of 26 kV, an injection pump flow rate of 0.4 mL/h, and a receiving distance of 10 cm, the hydrophobic electrospinning stock solution B obtained in step (3) was collected on the superhydrophilic electrospun fiber membrane obtained in step (2) for preparation of a hydrophobic electrospun fiber membrane.

Figure 5:
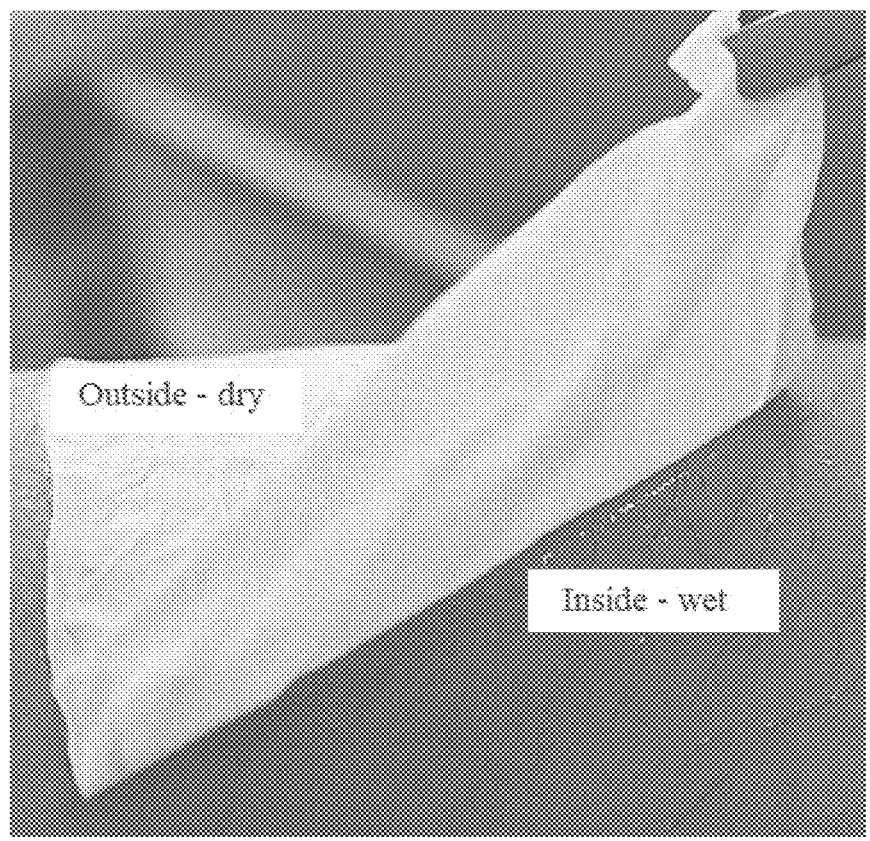
FIG. 5 is an optical photograph taken during use of the facial mask substrate obtained in Example 3 of the present invention.

(5) Finally, the double-layered membrane was removed from the oiled paper and placed in a 70° C. oven for 24 h to obtain an independent facial mask substrate with a unidirectional moisturizing function and asymmetric wettability. A nutrient solution was adsorbed to the hydrophilic layer and applied to a skin surface, and the hydrophobic layer remained dry (as shown in FIG. 5).

Figure 6:
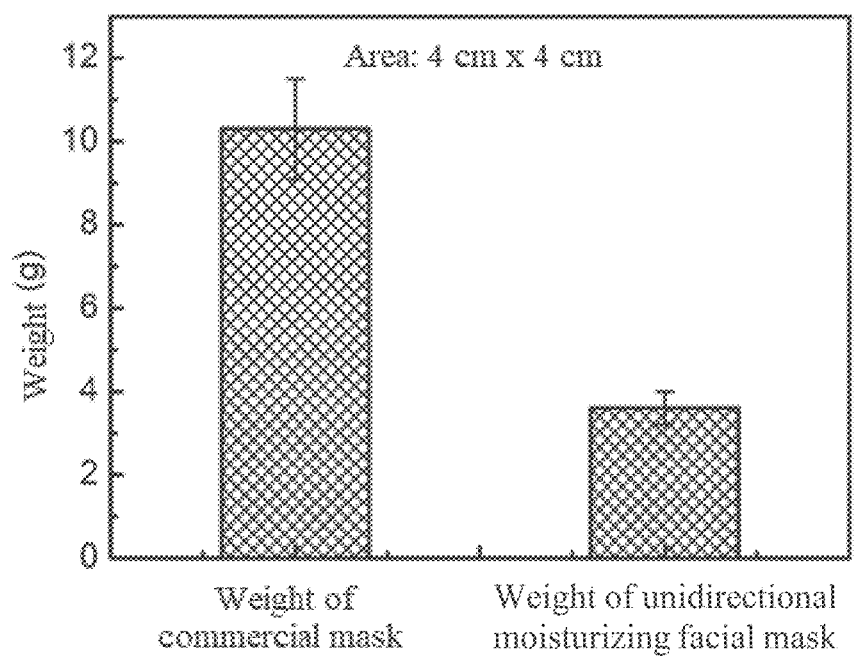
FIG. 6 is a mass comparison chart of the facial mask substrate obtained in Example 4 of the present invention and a commercially available, traditional commercial facial mask.

The unidirectional moisturizing facial mask and a wet commercial facial mask with a nutrient solution having the same area were weighed and compared. As shown by the results in FIG. 6, the weight of the unidirectional moisturizing facial mask is about 30-40% of that of the commercial facial mask.

Example 5

A facial mask substrate with a unidirectional moisturizing function and asymmetric wettability was prepared in the present example, including the following steps:

(1) Preparation of a superhydrophilic electrospinning stock solution A:

4 g of thermoplastic polyurethane (TPU) solid, 2 g of microcrystalline cellulose powder, and 0.2 g of lithium chloride powder metal salt were dissolved in 20 g of a tetrahydrofuran (THF) solvent. The solution was heated and stirred in a 70° C. water bath for 8 h to obtain a viscous and transparent superhydrophilic electrospinning stock solution A, which was cooled to room temperature for later use.

(2) Preparation of a superhydrophilic electrospun fiber membrane:

Using a single-needle electrospinning device, at a voltage of 18 kV, an injection pump flow rate of 0.2 mL/h, and a receiving distance of 12 cm, the superhydrophilic electrospinning stock solution A obtained in step (1) was collected on a gauze for preparation of a superhydrophilic electrospun fiber membrane, which was placed together with the gauze at room temperature for later use.

(3) Preparation of a hydrophobic electrospinning stock solution B:

0.3 g of superhydrophobic zinc oxide nanoparticles were dispersed in 20 g of a dimethylformamide (DMF) solvent, and ultrasonically dispersed for 60 min. 3 g of polyvinylidene fluoride (PVDF) solid and 0.3 g of lithium chloride were added to the dispersion, and stirred in a 70° C. water bath for 3 h to obtain a viscous and transparent hydrophobic electrospinning stock solution B, which was cooled to room temperature for later use.

(4) Preparation of a hydrophobic electrospun fiber membrane:

Using a single-needle electrospinning device, at a voltage of 26 kV, an injection pump flow rate of 0.4 mL/h, and a receiving distance of 10 cm, the hydrophobic electrospinning stock solution B obtained in step (3) was collected on the superhydrophilic electrospun fiber membrane obtained in step (2) for preparation of a hydrophobic electrospun fiber membrane.

(5) Finally, the double-layered membrane was removed from the gauze and placed in a 70° C. oven for 24 h to obtain an independent facial mask substrate with a unidirectional moisturizing function and asymmetric wettability.

Obviously, the above examples of the present invention are only examples for clearly illustrating the present invention, but are not intended to limit the embodiments of the present invention. For those of ordinary skill in the art, other different forms of changes or variations may also be made on the basis of the above description. It is impossible to list all the embodiments here. Any obvious changes or variations derived from the technical solutions of the present invention are still within the protection scope of the present invention.

The invention claimed is:

1. A preparation method of a unidirectional moisturizing nanofiber facial mask substrate with asymmetric wettability, comprising the following steps:
   preparing a superhydrophilic fiber membrane on a substrate by electrospinning;
   preparing a hydrophobic fiber membrane by electrospinning on a lateral surface of the superhydrophilic electrospun fiber membrane away from the substrate, thereby forming a double-layered membrane; and
   removing the substrate from the double-layered membrane, and
   drying the double-layered membrane after removing the substrate from the double-layered membrane to obtain the unidirectional moisturizing nanofiber facial mask substrate with asymmetric wettability.

2. The preparation method according to claim 1, wherein the step of preparing the superhydrophilic fiber membrane on the substrate by electrospinning comprises:
   preparation of a superhydrophilic electrospinning stock solution including the step of:
      dissolving thermoplastic polyurethane, a hydrophilic filler and a metal salt in a dimethylformamide or tetrahydrofuran solvent to obtain the superhydrophilic electrospinning stock solution; and
   preparation of the superhydrophilic fiber membrane including the step of:
      preparing the superhydrophilic fiber membrane by electrospinning the superhydrophilic electrospinning stock solution on the substrate, and placing the superhydrophilic electrospun fiber membrane together with the substrate at room temperature for later use.

3. The preparation method according to claim 2, wherein the hydrophilic filler is microcrystalline cellulose.

4. The preparation method according to claim 3, wherein the particle size of the microcrystalline cellulose is 15-25 µm.

5. The preparation method according to claim 2, wherein the mass ratio of the thermoplastic polyurethane to the hydrophilic filler to the metal salt to the dimethylformamide or tetrahydrofuran solvent is (10-5):(5-2.5):(0.5-1):50.

6. The preparation method according to claim 2, wherein the thermoplastic polyurethane, the hydrophilic filler and the metal salt are dissolved in the dimethylformamide or tetrahydrofuran solvent at 60-80° C., and stirred for 3-10 h to obtain the superhydrophilic electrospinning stock solution, which is cooled to room temperature for later use.

7. The preparation method according to claim 1, wherein the step of preparing the hydrophobic fiber membrane comprises:
   preparation of a hydrophobic electrospinning stock solution including the step of:
      dispersing a superhydrophobic nanomaterial in a dimethylformamide or tetrahydrofuran solvent to obtain a dispersion, and adding polyvinylidene fluoride and a metal salt to the dispersion to obtain the hydrophobic electrospinning stock solution; and
   preparation of the hydrophobic fiber membrane including the step of:
      preparing the hydrophobic fiber membrane by electrospinning the hydrophobic electrospinning stock solution on the lateral surface of the superhydrophilic fiber membrane away from the substrate, thereby forming the double-layered membrane.

8. The preparation method according to claim 7, wherein the superhydrophobic nanomaterial is one or a combination of two or more selected from the group consisting of: superhydrophobic silica aerogels, superhydrophobic zinc oxide nanoparticles, superhydrophobic titanium dioxide nanoparticles, and superhydrophobic magnesium hydroxide nanoparticles.

9. The preparation method according to claim 2, wherein the metal salt is lithium chloride.

10. The preparation method according to claim 7, wherein the metal salt is lithium chloride.

11. The preparation method according to claim 7, wherein the mass ratio of the polyvinylidene fluoride to the superhydrophobic nanomaterial to the metal salt to the dimethylformamide or tetrahydrofuran solvent is (20-40):1:(0.1-0.2):(50-200).

12. The preparation method according to claim 7, wherein the superhydrophobic nanomaterial is dispersed in the dimethylformamide or tetrahydrofuran solvent, and ultrasonically dispersed for 20-60 min to obtain the dispersion; and the polyvinylidene fluoride and the metal salt are added to the dispersion, and stirred at 40-60° C. for 1-3 h to obtain the hydrophobic electrospinning stock solution, which is cooled to room temperature for later use.

13. The preparation method according to claim 2, wherein the electrospinning is performed by a single-needle electrospinning device at a voltage of 18-26 kV, an injection pump flow rate of 0.2-0.4 mL/h, and a receiving distance of 10-15 cm.

14. The preparation method according to claim 7, wherein the electrospinning is performed by a single-needle electrospinning device at a voltage of 18-26 kV, an injection pump flow rate of 0.2-0.4 mL/h, and a receiving distance of 10-15 cm.

15. The preparation method according to claim 1, wherein the substrate is one selected from the group consisting of: aluminum foil, gauze, and oiled paper.

16. The preparation method according to claim 1, wherein the drying of the double-layered membrane is performed at 40-70° C. for 12-24 h.

\* \* \* \* \*